Feb. 23, 1971 — B. B. GARRETT — 3,565,468
BAND SEAL PIPE COUPLING WITH ADJUSTABLE FASTENING MEANS
Filed Jan. 6, 1969 — 2 Sheets-Sheet 1

BEN B. GARRETT
INVENTOR
WHANN & McMANIGAL
Attorneys for Applicant
BY

BEN B. GARRETT
INVENTOR
WHANN & McMANIGAL
Attorneys for Applicant
BY

United States Patent Office 3,565,468
Patented Feb. 23, 1971

3,565,468
BAND SEAL PIPE COUPLING WITH ADJUSTABLE FASTENING MEANS
Ben B. Garrett, Whittier, Calif., assignor to Mission Clay Products Corporation, Whittier, Calif., a corporation of California
Filed Jan. 6, 1969, Ser. No. 789,196
Int. Cl. F16l *17/06*
U.S. Cl. 285—373                6 Claims

ABSTRACT OF THE DISCLOSURE

A coupling and clamping device for connecting plain-end pipes in end-to-end relation, including a metal sleeve band having overlapped end extremities and means for anchoring an inner sealing sleeve therein against axial displacement, the band being compressible by flexible strap members connected at their ends by a threaded bolt and associated nut. The bolt extends through rockable plastic trunnions at the strap ends, and has a head portion with an inner transversely curved flange so as to apply clamping forces adjacent the ends of the trunnion. The bolt also has a frangible threaded end section which can be broken away after the coupling is installed. An additional feature includes a keeper bar which can be mounted over the threaded ends of the strap tightening bolts, this keeper having stops engageable with the associated nuts to retain them against turning, when the bolt is rotated. This keeper also serves to allocate the straps on the sleeve band with the proper spacing.

BACKGROUND OF THE INVENTION

The present invention relates to pipe coupling devices.

The present invention is in general concerned with couplings which can be utilized for the connecting of sewer pipes such as cast iron sewer pipe and pipes of similar character such as utilized in domestic plumbing and sewer installations. Heretofore, pipes for this purpose were joined together with bell and spigot joints, the joint being sealed by oakum in the hub or bell around the spigot, which was retained by pouring molten lead thereover and then hand-caulking until the joint was pressure-tight. Such known procedures, and utilization of this kind of pipe, was not only expensive but time consuming for the installation.

Currently, the trend is now toward the use of plain-end cast iron sewer pipe, and clamp on type sleeve and seal couplings for connecting the pipes in end-to-end abutting relation. The presently known couplings for this purpose have been quite complicated and relatively expensive to construct. For this reason, attempts have been made to use a simple threaded bolt and nut arrangement for the clamping of clamping sleeves or clamping straps around the coupled ends of the pipe. However, such arrangements have in general proved inefficient and undesirable for the particular purpose, and in many cases lacked the required strength.

According to the present invention, it is proposed to overcome the inherent disadvantages of the present rather complicated coupling devices available for this purpose, by providing a simplified clamping device which successfully utilizes the simple bolt and nut clamping means, and yet is so constructed as to provide the high strength necessary, and which can be applied by means of simple tools without endangering surrounding property and subjecting it to fire hazards as in the case of the older forms of joint connections utilizing caulked lead.

SUMMARY OF THE INVENTION

The present invention relates generally to pipe couplings, and is more specifically concerned with an improved coupling of the sleeve type having mounting clamping straps or bands.

It is one object of the herein described invention to provide a coupling of the character described, which is of simple construction and utilizes simple clamping bolts and nuts rather than more complicated worm gears, T-bolts and similar arrangements.

In accordance with one of the features of the present invention, it is an object to provide a pipe coupling of the type utilizing clamping bolts and nuts with associated trunnions, which is so arranged that the trunnions may be made of plastic rather than more expensive metal materials, and wherein the clamping forces at the head end of the bolt are applied to the trunnions in a unique manner which prevents crushing or rupturing of the trunnion inserts.

A further object is to provide an improved mounting for associating the trunnion inserts with clamping straps or bands, wherein the trunnions are surrounded by a metal case in such a manner that the trunnions will be subjected to compressive forces rather than tension forces. As thus arranged, plastic trunnions can be utilized instead of the more expensive metal trunnions, and yet provide a mounting which will have extremely high strength characteristics.

A further object is to provide, in a coupling of the type having a split clamping sleeve with overlapped ends, a greater overlap so that the ends will extend under the spaced clamping band ends and in effect form a "double walled" thickness bridging the space between the spaced ends of the associated clamping bands. This construction provides increased strength at a point which in conventional clamps is very weak, and a source of trouble.

A still further object is to provide a unique clamping sleeve which is so constructed that it will anchor the inner associated sealing sleeve against axial movement to a position where it would not be properly clamped and retained in its sealing position, thus avoiding the possibility of coupling failure.

Another object of the invention is to provide in connection with couplings of the herein described type utilizing clamping bolts with nuts, unique keeper means which will operate to retain the nuts against rotation when the bolts are rotated by applying a suitable tool to the bolt head, and wherein the keeper will further operate to keep the coupling clamping units in properly spaced relation.

In utilizing couplings of the type described herein, the couplings are often used on pipes which are installed within building walls. In many cases, in this type of installation, it is necessary to use clamping bolts of such length that, when the bolts are tightened to a final clamping position, these bolts will protrude sufficiently to engage the plaster walls in a manner to subsequently damage the wall or cause other undesirable results. It is therefore another object of the invention to provide the clamping bolts with a frangible section which will permit the breaking off the undesirable projecting ends of the clamping bolts after the coupling has been installed.

Further objects of the invention will be brought out in the following part of the specification, wherein detailed description is for the purpose of fully disclosing the invention without placing limitation thereon.

BRIEF DESCRIPTION OF THE DRAWINGS

Referring to the accompanying drawings, which are for illustrative purposes only.

DESCRIPTION OF THE PREFERRED EMBODIMENT

Figure 1:
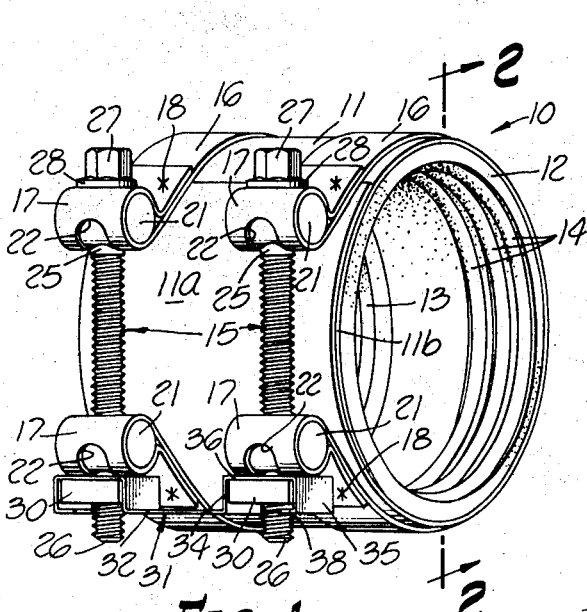
FIG. 1 is a perspective view of a pipe coupling embodying the features of the present invention.

Referring specifically to the drawings, there is shown in FIG. 1, for purposes of illustration, a coupling assembly embodying the features of the present invention. The coupling as generally indicated by the number 10 is shown as including a clamping sleeve 11 of stainless steel or other suitable material, which is adapted to surround the adjacent ends of pipe sections which are to be joined. The clamping sleeve is in the form of a flexible band having end extremities 11a and 11b in overlapping relation. The clamping sleeve is provided with manually operable means, as will hereafter be described in detail, for motivating the clamping sleeve in order to tighten it around an internal sealing sleeve member 12 of rubber, elastomeric or other suitable material. The sealing sleeve is of tubular construction and has a smooth outer surface. Inwardly, the sealing sleeve is provided with a medial inwardly projecting rib 13 which forms an abutment against which the ends of inserted pipes, which are to be joined by the coupling, will abut so as to assure proper overlap of the sleeve on the pipe ends and center the coupling with respect to the inserted pipe ends. At each end of the sleeve 12, the inner wall of the sleeve is provided with a series of integrally formed axially spaced ribs or rings 14 adapted to sealingly engage the associated inserted pipe end, when the coupling is operatively tightened into clamped position.

Clamping units, as generally indicated at 15, are provided respectively at the opposite ends of the clamping sleeve 11. Since each of these units is similarly constructed, it is believed that a clear understanding will be obtained from a description of only one of the units.

Figure 3:
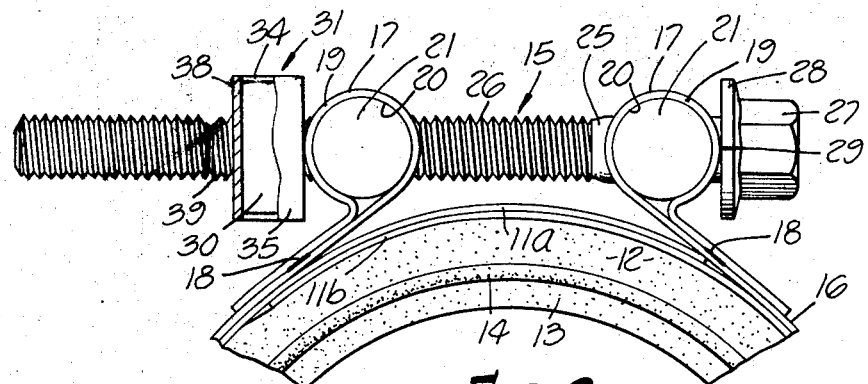
FIG. 3 is an enlarged fragmentary end elevational view showing the details of the mounting and operative relationship of the clamping elements.
Figure 4:
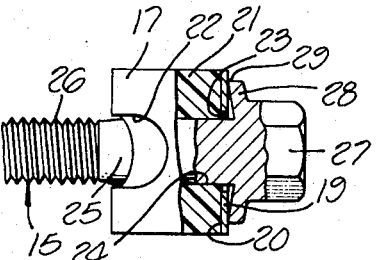
FIG. 4 is an enlarged fragmentary plan view of the head end of a clamping bolt showing its cooperative relationship with an associated trunnion insert.

Each clamping unit includes a clamping strap or band 16 of a suitable material such as stainless steel or the like. In order to retain the clamping band in proper assembled relation with respect to the clamping sleeve, the band may be spot welded to the clamping sleeve at one or more appropriate locations. As best illustrated in FIGS. 1 and 3, each end of the clamping band is similarly formed with a headed end section 17 by deflecting the band end portion into a circular configuration and welding the strap end as indicated at 18 to the adjacent band portion in close proximity to the circular portion thus formed. A circular wall 19 is thus formed, which provides a transversely extending passage 20 for receiving therein a cylindrical trunnion insert 21. This insert is preferably constructed of a suitable plastic such as polyvinylchloride or other suitable material. The trunnion is rockably supported and bears against the inner surface of the wall 19. As best seen in FIG. 4, the wall 19 is provided on opposite sides of the passage 20 with transversely aligned circumferentially extending elongated slots 22 and 23, and the insert 21 is also provided with a diametrically transverse passage 24. As thus arranged, the slots 22 and 23 and the passage 24 are registrable to permit passage therethrough of the shank portion 25 of a clamping bolt 26, this bolt having a head 27 adapted to receive an appropriate tool such as a wrench by means of which the clamping bolt may be rotated in the passage 24. Since the slots 22 and 23 are circumferentially elongated, rocking movement of the trunnion insert is readily permitted.

Upon further consideration of FIG. 4, it will be apparent that, if a bolt of conventional construction were used, its head portion during tightening of the clamping unit would apply pressure against weakened portions of the trunnion insert which lie adjacent the ends of the passage 24. Since the material of these inserts is somewhat brittle, there would be a tendency for the inserts to rupture and break under the clamping stresses. In the present invention, this difficulty has been overcome by providing an abutment shoulder 28 at the base of the bolt head 27, this shoulder being in the form of a peripherally extending circumferential flange having a dished or curved surface so that it will make peripheral engagement as indicated at point 29 with the adjacent wall 19. It will be observed that this point of engagement is near the ends of the trunnion insert 21 and that the clamping forces will therefore be applied at outwardly removed spaced positions away from the weakened portion of the insert adjacent the passage 24. Thus, it is possible to use the more economical plastic inserts rather than expensive metal inserts.

Each of the clamping bolts 27 threadedly receives a nut 30 which is adapted to engage the headed section 17 of the clamping band at the end thereof opposite the headed section engaged by the head 27 of the clamping bolt.

In clamping units of this type, there has hereinbefore been a problem due to the turning of the nuts when the clamping bolt is tightened from the head end. This problem is especially acute, where a plumber uses these clamps to join sewer pipes. One hand is needed to hold the pipe in line, while the other hand tightens the bolts. In the event that the nut turns with the bolt, the tightening operation can become rather difficult. In order to obviate this difficulty, it is a feature of the present invention to provide a unique keeper which not only prevents turning of the nuts, but also aids in keeping the clamping units and associated parts in properly spaced relation.

Figure 5:
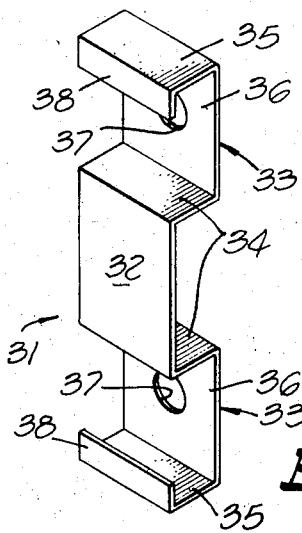
FIG. 5 is a detailed perspective view of the keeper means.

A keeper for the above noted purpose, as generally indicated at 31, is shown in FIG. 5 as embodying an elongate member which is fabricated from a flat strap of suitable material, preferably metal, and which is arranged to extend between the nut receiving ends of the clamping bolts. More specifically, the strap member is formed to provide a central flat body portion 32 which connects at its ends with integrally formed similarly offset U-shaped end portions 33—33. Each of these end portions includes an inner wall 34, an outer wall 35, and a connecting bottom wall 36. The walls 34 and 35 are in parallel spaced relation at right angles to the bottom wall 36 which is provided with a central opening 37 adapted to receive the shank of a clamping bolt 26 therethrough. The U-shaped end portion 33 is properly dimensioned to receive a nut 30 therein, and the wall 35 is preferably provided with a nut retaining lip 38 for holding the associated nut within the end portion. As thus arranged, it will be appreciated that the walls 34 and 35 at each end portion 33 constitute stop abutments which prevent rotation of the nut and provide anchor means therefor during rotational movement of the clamping bolt, when it is being tightened. The keeper also maintains a predetermined spacing between the clamping bolts so that the clamping units will be retained in a proper oriented and spaced relation.

In order to enable removal of excess projecting end portions of the clamping bolts after the coupling has been applied to the pipe ends and the clamping units tightened up, it is a feature of the present invention to provide each of the clamping bolts with a circumferentially extending frangible or break line 39, whereby the end portion of the bolt may be detached by a simple bending and twisting operation. This frangible line or section may be formed, for example, by making a circumferentially extending groove around the shank of the bolt so as to provide a reduced diameter portion which can be broken without difficulty.

Referring again to FIG. 3, it is an important feature of the present invention to utilize a relatively long overlap of the end extremities 11a and 11b of the flexible band which forms the clamping sleeve. In the present invention, the clamping sleeve is made of sufficient length to permit the end extremities to extend well under the spaced ends of the clamping strap or band 16. It has been found that with narrow overlaps, the sealing sleeve is not properly supported in the space between the clamping band ends, and a generally weak structure is obtained at this point which permits the sealing sleeve to bulge outwardly and thus assume a configuration in which it does not operate efficiently and may even fail. This disadvantage is overcome in the long overlap of the present invention which forms in effect a double wall which bridges the space between the clamping band ends and provides greatly increased strength at this point.

Although the construction as thus far described will operate advantageously under most conditions, it has been found that when the couplings are installed under conditions in which there may be an internal pressure within the connected pipes, there may arise a tendency of the sealing sleeve to be shifted axially within the clamping sleeve to such an extent as to impair the operative effectiveness of the jointure between the pipes.

Where pressure conditions exist, it is within the concepts of the present invention to provide anchoring means between the clamping sleeve and the sealing sleeve of such character that, when the coupling is properly applied, the sealing sleeve will be anchored against axial movement within the clamping sleeve. For this purpose, the clamping sleeve may be modified in several ways as respectively illustrated in FIGS. 6 to 10 inclusive.

Figure 6:
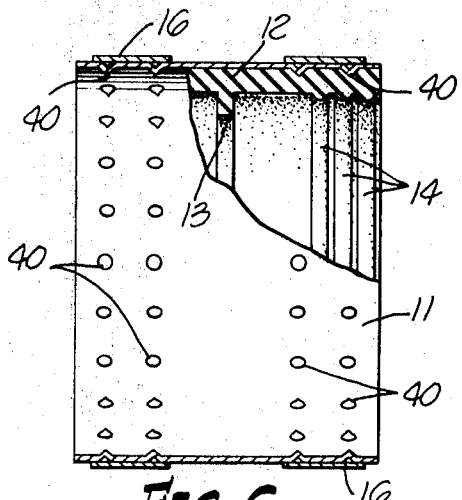
FIGS. 6 to 10 inclusive are fragmentary transverse sectional views similar to FIG. 2, except having cutaway portions of the sealing sleeve to illustrate the several modified clamping sleeve structures for anchoring the sealing sleeve therein.

As shown in FIG. 6, the end margins of the clamping sleeve 11 are provided with circumferentially extending rows of inwardly extending pointed projections 40. The projections of the rows are axially spaced apart of the clamping sleeve and are preferably axially offset in the adjacent rows. These projections under the clamping action of the clamping sleeve will deform the outer surface of the sealing sleeve and anchor it against axial displacement within the clamping sleeve.

Figure 2:
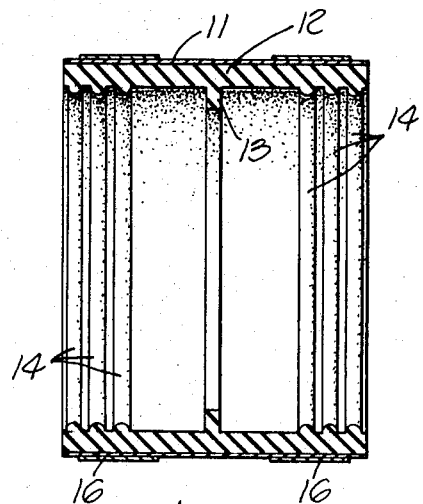
FIG. 2 is a transverse sectional view through the coupling, taken substantially on line 2—2 of FIG. 1.
Figure 7:
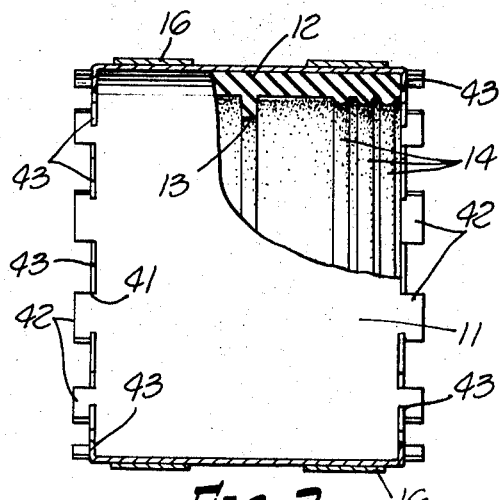

In the modification shown in FIG. 7, the engaged surfaces of the clamping sleeve and sealing sleeve are smooth, as shown in FIG. 2. In this modification, however, the anchoring is accomplished by slitting the end margins of the clamping sleeve to provide circumferentially spaced slits 41 and define tab or ear portions 42. These ear portions are bent inwardly at desired intervals around the circumference so as to form inwardly extending projections 43 adapted to overlie the end edges of the sealing sleeve and retain it against axial movement.

Figure 8:
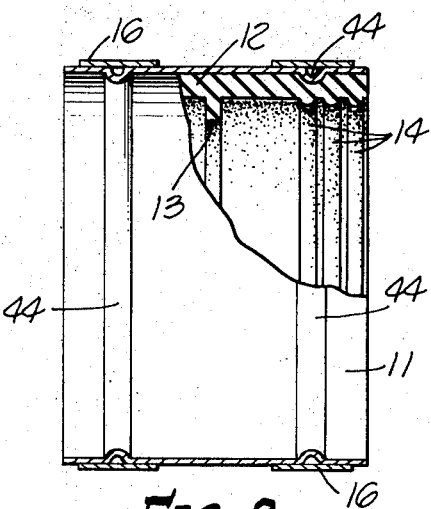

In FIG. 8, the anchoring means is in the form of beads or ribs 44 which are adapted to press into the outer surface of the sealing sleeve, when the clamping sleeve is tightened. While the rib structure as shown in FIG. 8 operates quite satisfactorily, the ribs tend to make the clamping sleeve less flexible and thus less desirable than the other modifications which do not interfere with the flexibility of the clamping sleeve.

Figure 9:
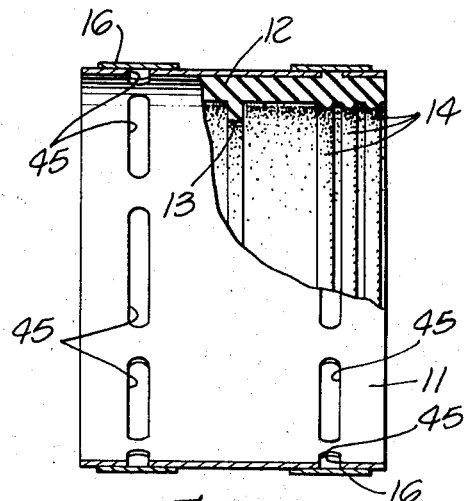
Figure 10:
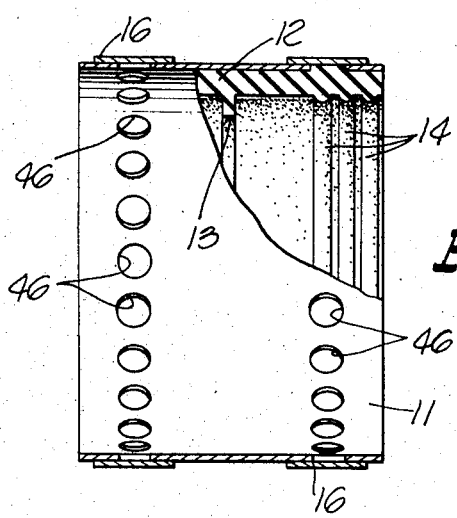

FIGS. 9 and 10 operate in a similar manner. In the structure shown in FIG. 9, circumferentially spaced elongate openings or slots 45 are formed at the ends of the clamping sleeve, while in FIG. 10, round openings 46 have been utilized instead of the slot configuration. The operation of these two arrangements is similar in that they permit the outer surface material of the sealing sleeve to bulge into the openings, when the clamping sleeve is tightened, and thus serve to anchor the sealing sleeve against axial movement within the clamping sleeve.

From the foregoing description, it is believed clearly evident that the designated objects and features of the invention will be attained.

Various modifications may suggest themselves to those skilled in the art without departing from the spirit of my inventiton, and, hence, I do not wish to be restricted to the specific form shown or uses mentioned, except to the extent indicated in the appended claims.

I claim:
1. A coupling for joining two pipe sections in end-to-end alignment, comprising:
 (a) a clamping sleeve adapted to surround the adjacent ends of the pipe sections to be joined, said sleeve being formed of a flexible band having end extremities in overlapping relation;
 (b) flexible straps respectively carried by opposite ends of said sleeve, each of said straps extending circumferentially around the sleeve exterior and having its ends in spaced relation;
 (c) means at each of the spaced ends of each of said straps including a trunnion member supported for relative rotative movement about an axis extending transversely of the strap end, the trunnion member having a passage therethrough normal to its axis, the trunnions of each strap being independent of the trunnions of the other straps; and
 (d) means connecting said means at the ends of each strap having a head end portion extending through the passage of one of said trunnion members and a threaded shank portion extending through the passage of the other of said trunnion members, said shank portion having an associated part cooperable therewith to tighten and loosen the associated straps.

2. A coupling according to claim 1, wherein the wall forming portions are metal and the trunnions are of a plastic material.

3. A coupling according to claim 1, wherein the underlying overlap of the ends of the clamping sleeve forms a double wall thickness bridging the spaces between the strap ends.

4. As an article of manufacture, clamping means comprising:
 (a) a clamping band of flexible material including a wall forming portion providing a generally cylindrical transverse passage at each end extremity of the band, said band being positionable in use with its end extremities adjacently spaced apart wherein the end edge margin of the band is anchored by bonding to an inner poriton of the band in closely adjacent proximity to the cylindrical shaped portion to form a substantially closed continuous wall around the insert;
 (b) a trunnion insert of a solid plastic material rockably supported in each of said passages, each of said inserts having a transverse pasasge aligned at its ends with circumferential slots in the associated wall forming portion; and
 (c) a threaded member extending through said slots and insert passages and having a head at one end engageable with an outer side of one of said wall forming portions, and an opposite end projecting outwardly of the other of said wall forming portions for receiving a nut operable into engagement with an outer side of said other wall forming portion, whereby the plastic trunnion inserts are subjected to compression forces.

5. An article of manufacture according to claim 4, wherein the head of the threaded member has a shoulder engageable with the associated wall forming portion adjacent end portions of said insert therein, whereby said compressive forces are applied to the insert in outwardly spaced relation to the transverse passage therein.

6. An article of manufacture according to claim 4, wherein the head of the threaded member has a circumferentially extending inner flange, said flange being transversely curved, whereby the flange at its periphery makes engagement with the side of the associated wall forming portion at points spaced axially outwardly from the transverse passage of the insert therein.

References Cited

UNITED STATES PATENTS

| | | | |
|---|---|---|---|
| 385,442 | 7/1888 | Burton | 151—55 |
| 3,104,898 | 9/1963 | MacDonald et al. | 285—367X |
| 3,211,475 | 10/1965 | Freed et al. | 285—367X |
| 3,233,922 | 2/1966 | Evans | 285—367X |
| 3,339,215 | 9/1967 | Flood | 285—4X |

FOREIGN PATENTS

| | | | |
|---|---|---|---|
| 1,011,740 | 4/1952 | France | 285—367 |
| 1,507,846 | 11/1967 | France | 285—369 |

DAVE W. AROLA, Primary Examiner

U.S. Cl. X.R.

24—279; 285—423